US012589485B2

(12) United States Patent
Utsumi et al.

(10) Patent No.: US 12,589,485 B2
(45) Date of Patent: Mar. 31, 2026

(54) TEACHING POINT GENERATION DEVICE THAT GENERATES TEACHING POINTS ON BASIS OF OUTPUT OF SENSOR, AND TEACHING POINT GENERATION METHOD

(71) Applicant: FANUC CORPORATION, Yamanashi (JP)

(72) Inventors: Ryunosuke Utsumi, Yamanashi (JP); Shigeo Yoshida, Yamanashi (JP); Yuichi Matsuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 264 days.

(21) Appl. No.: 18/547,694

(22) PCT Filed: Feb. 24, 2022

(86) PCT No.: PCT/JP2022/007694
§ 371 (c)(1),
(2) Date: Aug. 24, 2023

(87) PCT Pub. No.: WO2022/186054
PCT Pub. Date: Sep. 9, 2022

(65) Prior Publication Data
US 2024/0123606 A1　Apr. 18, 2024

(30) Foreign Application Priority Data
Mar. 2, 2021　(JP) ................................. 2021-032599

(51) Int. Cl.
*B25J 9/00*　(2006.01)
*B25J 9/16*　(2006.01)
(Continued)

(52) U.S. Cl.
CPC ........... *B25J 9/0081* (2013.01); *B25J 9/1664* (2013.01); *B25J 11/005* (2013.01); *B25J 19/022* (2013.01)

(58) Field of Classification Search
CPC .......... G05B 19/42; G05B 2219/37275; G05B 2219/45104; G05B 2219/37555;
(Continued)

(56) References Cited

U.S. PATENT DOCUMENTS 5,265,194 A * 11/1993 Kanamori .......... G05B 19/4083
700/254
5,993,044 A * 11/1999 Ohto ....................... G06F 17/17
700/262
(Continued)

FOREIGN PATENT DOCUMENTS

CN　102243498 A　11/2011
CN　104128692 A　11/2014
(Continued)

OTHER PUBLICATIONS

Nakata et al., Rotation trajectory self-teaching performance of measurement robot, 1998, IEEE, p. 1640-1645 (Year: 1998).*
(Continued)

*Primary Examiner* — Mcdieunel Marc
(74) *Attorney, Agent, or Firm* — HAUPTMAN HAM, LLP

(57) ABSTRACT

A robot control device includes a search point calculation unit that calculates the position of a search point on the basis of at least one teaching point; and a command unit that drives a robot such that the position of the robot corresponds to the search point. The robot control device includes a teaching point setting unit that sets the positions of the teaching points on the basis of a working position detected by a laser sensor. The robot control device sets the positions
(Continued)

of a plurality of teaching points arranged along a work line by repeating: the calculation of the position of the search point by the search point calculation unit; the driving of the robot by the command unit; and the setting of the positions of the teaching points by the teaching point setting unit.

9 Claims, 15 Drawing Sheets

(51) Int. Cl.
 *B25J 11/00* (2006.01)
 *B25J 19/02* (2006.01)
(58) Field of Classification Search
 CPC .......... G05B 2219/45135; B25J 11/005; B25J 9/1664; B25J 9/0081; B25J 19/022
 See application file for complete search history.

(56) References Cited

U.S. PATENT DOCUMENTS

| | | | | |
|---|---|---|---|---|
| 6,804,580 | B1 * | 10/2004 | Stoddard | B25J 9/1669 |
| | | | | 318/568.13 |
| 6,853,881 | B2 * | 2/2005 | Watanabe | G05B 19/425 |
| | | | | 318/568.22 |
| 7,164,971 | B2 * | 1/2007 | Ferla | H01H 9/0214 |
| | | | | 700/61 |
| 9,110,466 | B2 * | 8/2015 | Yanagawa | G05B 19/42 |
| 10,532,460 | B2 * | 1/2020 | Oumi | B25J 9/1697 |
| 2009/0179021 | A1 | 7/2009 | Nishimura et al. | |
| 2011/0238215 | A1 * | 9/2011 | Yanagawa | G05B 19/42 |
| | | | | 901/3 |
| 2014/0031982 | A1 * | 1/2014 | Yamada | B25J 9/1676 |
| | | | | 700/255 |
| 2018/0319013 | A1 * | 11/2018 | Shimodaira | B25J 9/163 |
| 2024/0083022 | A1 * | 3/2024 | Utsumi | B25J 9/1664 |

FOREIGN PATENT DOCUMENTS

| | | | |
|---|---|---|---|
| CN | 111055046 | A | 4/2020 |
| CN | 112223294 | A | 1/2021 |
| JP | H07-104831 | A | 4/1995 |
| JP | H08-166813 | A | 6/1996 |
| JP | H09-277045 | A | 10/1997 |
| JP | H11000883 | A | 1/1999 |
| JP | 2001-318715 | A | 11/2001 |
| JP | 2004-261878 | A | 9/2004 |
| JP | 2017-121637 | A | 7/2017 |
| JP | 2020-082287 | A | 6/2020 |

OTHER PUBLICATIONS

Ando et al., Current Status and Future of Intelligent Industrial Robots, 1983, IEEE, p. 291-299 (Year: 1983).*

Grzejszczak et al., Robot Manipulator Teaching Techniques with Use of Hand Gestures, 2015, IEEE, p. 71-77 (Year: 2015).*

Lee et al., The direct teaching and playback method for robotic deburring system using the adaptiveforce-control, 2009, IEEE, p. 235-2241 (Year: 2009).*

Fukuda et al., Direct teaching and error recovery method for assembly task based on a transition process of a constraint condition, 2001, IEEE, p. 1518-1523 (Year: 2001).*

Kawasaki et al., Virtual teaching based on hand manipulability for multi-fingered robots, 2001, IEEE, p. 1388-1393 (Year: 2001).*

Onda et al., Teaching by demonstration of assembly motion in VR-detection of nondeterministic search-type motion and developing of its skillful motion primitive, 2002, IEEE, p. 2640-2645 (Year: 2002).*

Demura et al., A Trajectory Modification Method for Tool Operation Based on Human Demonstration Using MITATE Technique, 2018, IEEE, p. 1915-1920 (Year: 2018).*

* cited by examiner

TEACHING POINT GENERATION DEVICE THAT GENERATES TEACHING POINTS ON BASIS OF OUTPUT OF SENSOR, AND TEACHING POINT GENERATION METHOD

RELATED APPLICATIONS

The present application is a National Phase of International Application No. PCT/JP2022/007694 filed Feb. 24, 2022, which claims priority to Japanese Application No. 2021-032599, filed Mar. 2, 2021.

TECHNICAL FIELD

The present invention relates to a teaching point generation apparatus and a teaching point generation method for generating a teaching point based on the output of a sensor.

RELATED ART

A robot apparatus includes a robot, an operation tool attached to the robot, and a controller configured to control the robot. The controller drives the robot and the operation tool based on a work program. An operator can teach a teaching point in advance in order to determine a position and an orientation of the robot during a period of performing the operation. The work program is created based on the position of the teaching point.

The position of the teaching point can have a significant impact on the quality of the operation performed by the robot apparatus. For example, in a robot apparatus that performs arc welding, the robot moves the welding torch along an operation path determined based on the teaching points. When the operation path deviates from the desired path, the position of welding will also deviate.

In order to reduce such deviation of the welding position, a control is known in which a laser sensor is arranged on the welding torch and the operation path is corrected while welding is performed. For example, while the welding is performed, a laser sensor detects the operation position to be welded. It is known that the controller corrects the operation path, which is determined by the work program, based on the operation position detected by a laser sensor (e.g., Japanese Unexamined Patent Publication No. 9-277045A and Japanese Unexamined Patent Publication No. 8-166813A).

In addition, a control is known in which an operation path is generated in advance by designating a start point and an end point, and while advancing the position of the robot along the operation path, the position of welding detected by the laser sensor is set to the teaching point (e.g., Japanese Unexamined Patent Publication No. 7-104831A).

CITATION LIST

Patent Literature

[PTL 1] Japanese Unexamined Patent Publication No. 9-277045A
[PTL 2] Japanese Unexamined Patent Publication No. 8-166813A
[PTL 3] Japanese Unexamined Patent Publication No. 7-104831A

SUMMARY OF INVENTION

Technical Problem

In order for the robot apparatus to operate with high accuracy, it is preferable to set the teaching point precisely. For the teaching point determined in the work program, for example, the operator operates the teach pendant so as to change the position and the orientation of the robot such that the operation tool is in a desired position and orientation. Then, when the position and the orientation of the robot reaches the desired position and the orientation, the teaching operation for setting the teaching point can be performed.

However, it is sometimes difficult to perform this teaching operation. For example, when manually adjusting the position and the orientation of the robot in order to perform arc welding, the distance between the weld line to be welded and the tip point of the welding torch becomes shorter. The operator may have to adjust the position of the tip point of the welding torch with an accuracy of 1 mm or less. Many teaching points have to be set up along the weld line, which takes a long operation time. In addition, the operator will need a high level of skill. In particular, when the weld line includes a curve, it is necessary to generate many teaching points in a range in which the extension direction of the weld line changes. There is the problem that considerable time is required in order for the operator to generate teaching points.

Furthermore, by attaching a laser sensor to the robot apparatus, the operation path for welding can be corrected by the output of the laser sensor while the actual welding operation is performed. However, in order to perform this control, a teaching point must be set in advance. In other words, it is necessary to predetermine the teaching point as a reference for the operation path.

Solution to Problem

One aspect of the present disclosure is a teaching point generation apparatus configured to generate a teaching point of a robot apparatus including a robot and an operation tool. The teaching point generation apparatus includes a sensor configured to detect an operation position on an operation line in which the robot apparatus performs operation on a workpiece. The teaching point generation apparatus includes a search point calculating unit configured to calculate a position of a search point for determining a next teaching point along the operation line based on at least one teaching point, and a command unit configured to drive the robot so that the position of the robot moves to a movement point corresponding to the search point. The teaching point generation apparatus includes a teaching point setting unit configured to set a position of a teaching point based on the operation position detected by the sensor, after the position of the robot moves to the movement point. The teaching point generation apparatus sets the positions of a plurality of the teaching points along the operation line, by repeating a setting control including the calculating a position of a search point by the search point calculating unit, the driving the robot by the command unit, and the setting a position of a teaching point by the teaching point setting unit.

Another aspect of the present disclosure is a teaching point generation method for generating a teaching point of a robot apparatus including a robot and an operation tool. The teaching point generation method includes a search point calculating step of calculating a position of a search point for determining a next teaching point along an operation line based on at least one teaching point, and a drive step of driving the robot so that the position of the robot moves to a movement point corresponding to the search point. The teaching point generation method includes a position detecting step of detecting, by a sensor, an operation position on the operation line in which the robot apparatus performs operation on a workpiece, after the position of the robot moves to the movement point. The teaching point generation method includes a teaching point setting step of setting a position of a teaching point based on the operation position detected by the sensor. The positions of a plurality of the teaching points along the operation line are set by repeating a setting step including the search point calculating step, the drive step, the position detecting step, and the teaching point setting step.

Advantageous Effect of Invention

According to aspects of the present disclosure, a teaching point generation apparatus and a teaching point generation method for automatically setting a position of a teaching point can be provided.

BRIEF DESCRIPTION OF DRAWINGS

FIG. 2 is a block diagram of a robot apparatus according to an embodiment.

DESCRIPTION OF EMBODIMENTS

A teaching point generation apparatus and a teaching point generation method according to an embodiment will be described with reference to FIGS. 1 to 15. In the present embodiment, description will be made by exemplifying a robot apparatus that fixes a plurality of workpieces by arc welding.

Figure 1:
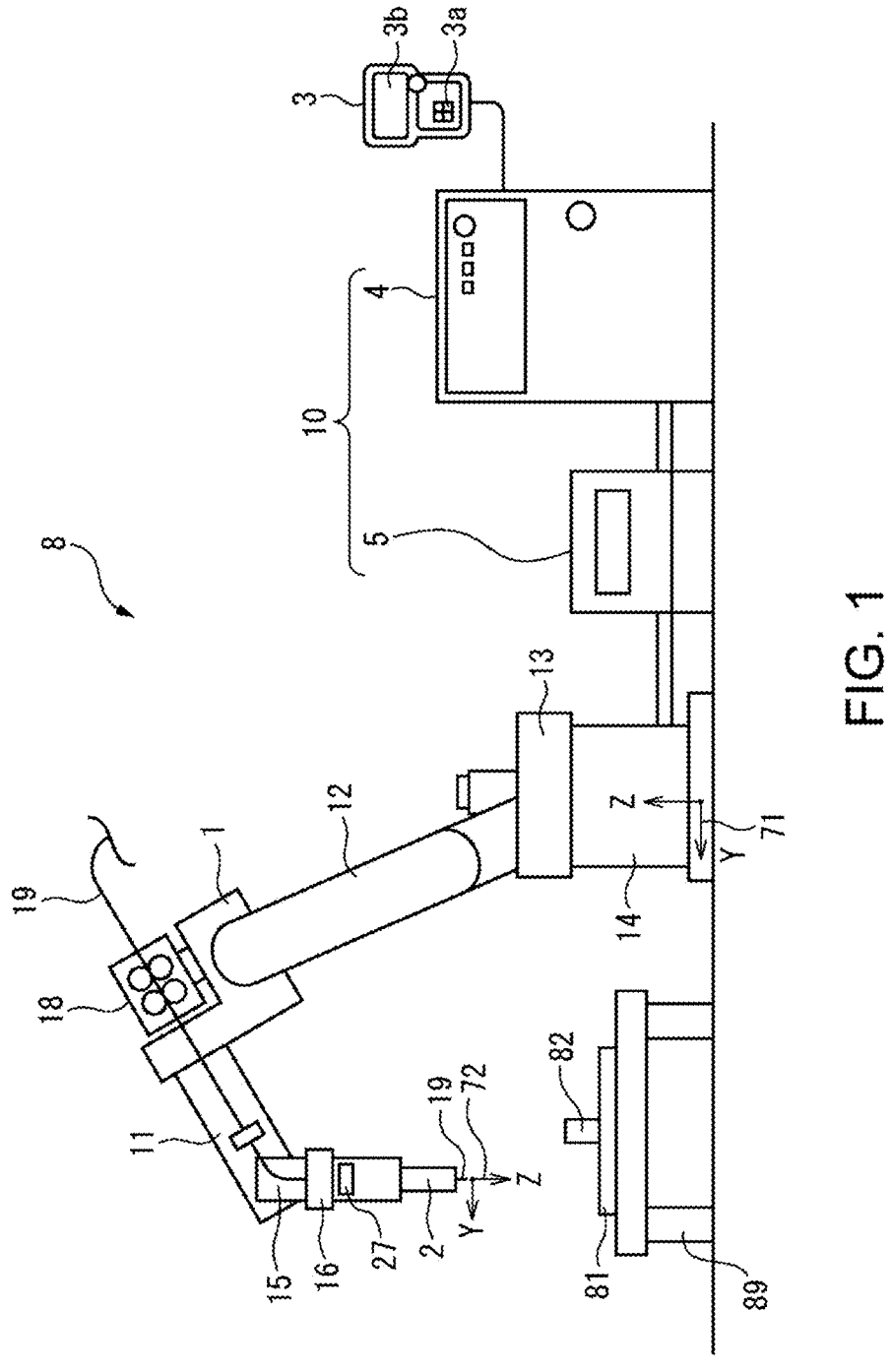
FIG. 1 is a schematic diagram of a robot apparatus according to an embodiment.
Figure 2:
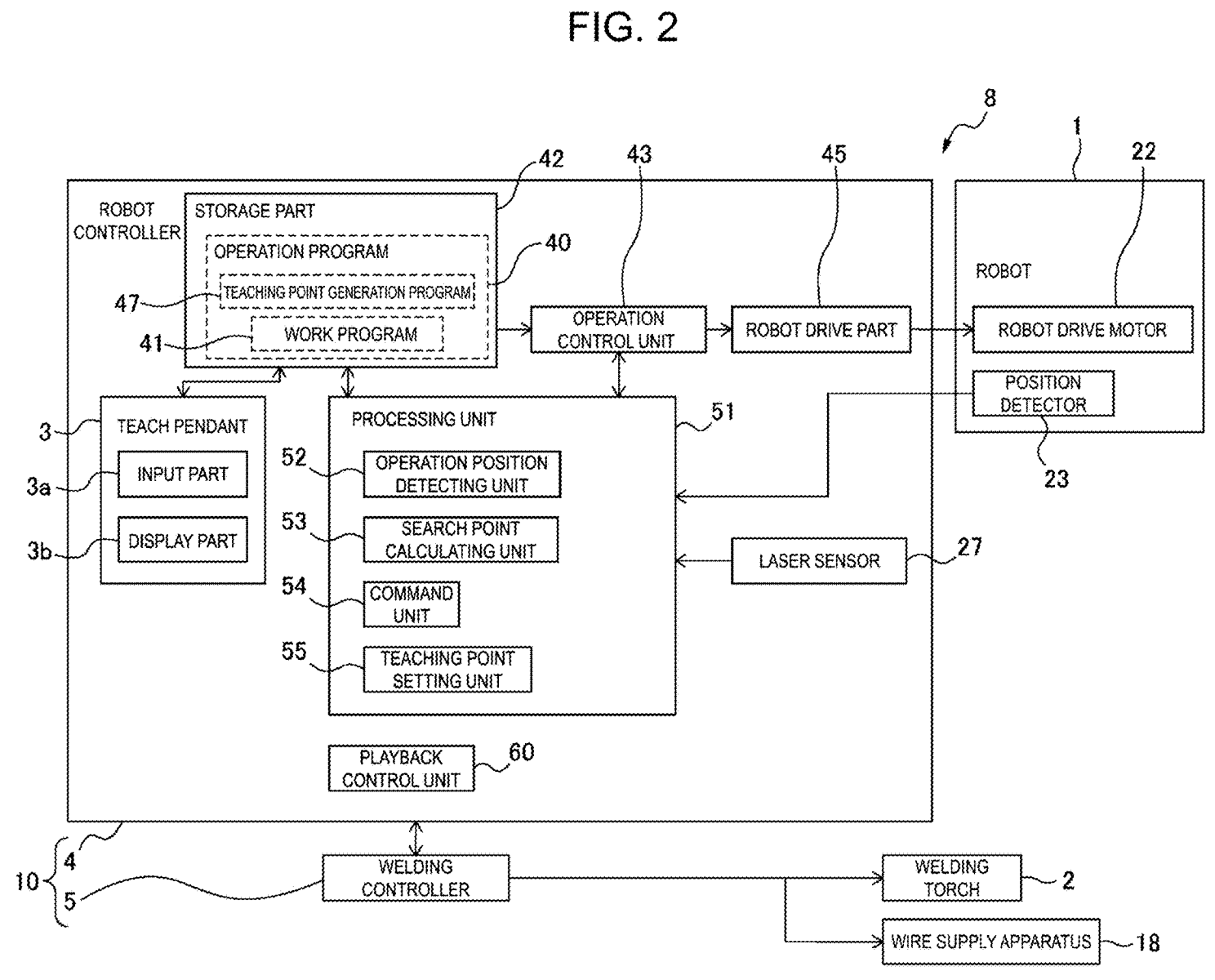

FIG. 1 is a schematic diagram of a robot apparatus according to the present embodiment. FIG. 2 is a block diagram of the robot apparatus according to the present embodiment. Referring to FIGS. 1 and 2, the robot apparatus 8 includes a welding torch 2 serving as an operation tool and a robot 1 that moves the welding torch 2. The robot 1 of the present embodiment is an articulated robot including a plurality of joints.

The robot 1 includes a base 14 and a turning base 13 supported by the base 14. The base 14 is fixed to an installation surface. The turning base 13 rotates with respect to the base 14. The robot 1 includes an upper arm 11 and a lower arm 12. The lower arm 12 is supported by the turning base 13 through a joint. The upper arm 11 is supported by the lower arm 12 through a joint. The robot 1 includes a wrist 15 connected to the end portion of the upper arm 11. The wrist is supported by the upper arm 11 through a joint. The welding torch 2 is fixed to a flange 16 of the wrist 15. The operation tool is not limited to the welding torch, but any apparatus corresponding to the operation performed by the robot apparatus can be adopted.

The robot 1 of the present embodiment includes six drive axes. The robot 1 includes a robot drive apparatus that drives a component of the robot 1, such as the upper arm 11. The robot drive apparatus of the present embodiment includes a plurality of robot drive motors 22 configured to drive the upper arm 11, the lower arm 12, the turning base 13, and the wrist 15. At the joint, the position and the orientation of the robot 1 are changed by the direction of the component of the robot 1 being changed.

A controller 10 of the robot apparatus 8 includes a robot controller 4 configured to control the robot 1. The robot controller 4 includes an arithmetic processing apparatus (computer) including a Central Processing Unit (CPU) serving as a processor. The arithmetic processing apparatus includes a Random Access Memory (RAM), a Read Only Memory (ROM), and the like, connected to the CPU via a bus.

The robot apparatus 8 includes a wire supply apparatus 18 configured to supply a wire 19 to the welding torch 2. The wire supply apparatus 18 supplies the welding torch 2 with the wire 19 that is consumed as welding is performed. The wire supply apparatus 18 of the present embodiment is fixed to the robot 1.

The controller 10 of a robot apparatus 8 includes a welding controller 5 configured to control the welding torch 2 and the wire supply apparatus 18. The welding controller 5 includes an arithmetic processing apparatus that includes a CPU serving as a processor, and a RAM and the like connected to the CPU via a bus. Additionally, the welding controller 5 includes an electrical circuit configured to supply electricity to the welding torch 2 and the wire supply apparatus 18. The welding controller 5 is configured to communicate with the robot controller 4. The welding controller 5 supplies electricity to the welding torch 2 or supplies the wire 19 depending on the operation of the robot 1. The welding controller 5 of the present embodiment is controlled by the robot controller 4.

The robot controller 4 includes a teach pendant 3 serving as an operation panel by which an operator manually operates the robot apparatus 8. The teach pendant 3 includes an input part 3a configured to enter information on the robot 1 and the welding torch 2. The input part 3a is constituted of a keyboard, a dial, and other components. The teach pendant 3 includes a display part 3b configured to display information on the control of the robot apparatus 8. The display part 3b is constituted of a display panel such as a liquid crystal display panel. Note that the display part 3*b* may include a touch-panel type display panel. In this case, the display part 3*b* has a function of the input part 3*a*.

The robot controller 4 drives the robot and the operation tool according to an operation program 40. The operation program 40 of the present embodiment includes a work program 41 for performing a predetermined operation such as welding with the robot apparatus 8. The position and the orientation of the robot 1 are changed based on the teaching point determined in the work program 41. The welding controller 5 supplies current to the welding torch 2 and controls the wire supply apparatus 18 based on the work program 41.

The robot controller 4 includes a storage part 42 configured to store information on the control of the robot 1 and the welding torch 2. The storage part 42 can be formed by a non-transitory storage medium capable of storing information, such as a volatile memory, a nonvolatile memory, or a hard disk. The operation program 40, including the work program 41 and a teaching point generation program 47, is stored in the storage part 42.

The work program 41 determines teaching points for driving the robot apparatus 8. The robot controller 4 includes an operation control unit 43 configured to send operation commands for the robot 1 and the welding torch 2. The operation control unit 43 corresponds to a processor driven according to the work program 41. The processor functions as the operation control unit 43 by reading the work program 41 and performing the controls determined in the work program 41. Alternatively, the processor functions as the operation control unit 43 by driving the robot 1 based on a command from a processing unit 51 or a command from a playback control unit 60.

The operation control unit 43 sends an operation command to a robot drive part 45 for driving the robot 1. The robot drive part 45 includes an electrical circuit configured to drive a robot drive motor 22. The robot drive part 45 supplies electricity to the robot drive motor 22 based on an operation command. Further, the operation control unit 43 controls the operation of the welding torch 2. The operation control unit 43 sends an operation command, to the welding controller 5, for driving the welding torch 2 and the wire supply apparatus 18 based on the work program 41. The welding controller 5 supplies electricity to the welding torch 2 and the wire supply apparatus 18 based on the operation command.

The robot 1 includes a state detector configured to detect the position and the orientation of the robot 1. The state detector according to the present embodiment includes a position detector 23 attached to the robot drive motor 22. From the output of the position detector 23, the direction of the member of robot 1 in each drive axis can be acquired. For example, the position detector 23 detects the rotation angle when the robot drive motor 22 drives. In the present embodiment, the position and the orientation of the robot 1 are detected based on the outputs of a plurality of the position detectors 23.

A world coordinate system 71 is set for the robot apparatus 8 of the present embodiment. In the example illustrated in FIG. 1, the origin of the world coordinate system 71 is arranged at the base 14 of the robot 1. The world coordinate system 71 is also referred to as a reference coordinate system of the robot apparatus 8. The world coordinate system 71 is a coordinate system in which the position of the origin is fixed and the direction of the coordinate axis is fixed. Even when the position and the orientation of the robot 1 change, the position and the direction of the world coordinate system

71 do not change. The world coordinate system 71 includes X, Y, and Z axes orthogonal to each other as coordinate axes. In addition, a W-axis is set as the coordinate axis around the X-axis. A P-axis is set as the coordinate axis around the Y-axis. An R-axis is set as the coordinate axis around the Z-axis.

In the present embodiment, a tool coordinate system having an origin set at any position of the operation tool is set. The origin of a tool coordinate system 72 of the present embodiment is set at the tool center point. The tool coordinate system 72 includes X, Y, and Z axes orthogonal to each other as coordinate axes. The tool coordinate system 72 includes a W-axis around the X-axis, a P-axis around the Y-axis, and an R-axis around the Z-axis. In the example illustrated in FIG. 1, the tool coordinate system 72 has its origin set at the tip point of the wire 19. The tool coordinate system 72 is set such that the extension direction of the Z-axis is parallel to the extension direction of the wire 19 protruding from the tip of the welding torch 2.

As the position and the orientation of the robot 1 change, the position and the direction of the origin of the tool coordinate system 72 change. For example, the position of the robot 1 corresponds to the position of the tool center point (the position of the origin of the tool coordinate system 72). Furthermore, the orientation of the robot 1 corresponds to the direction of the tool coordinate system 72 relative to the world coordinate system 71.

The robot apparatus 8 includes a teaching point generation apparatus configured to generate the teaching point of the robot apparatus 8 including the robot 1 and the welding torch 2. In the present embodiment, the robot controller 4 functions as a teaching point generation apparatus. The robot controller 4 includes a laser sensor 27 serving as a sensor configured to detect the operation position on the operation line of the workpiece on which the robot apparatus 8 performs operation. In the present embodiment, the welding position as the operation position on the weld line of the workpieces 81 and 82 is detected based on the output of the laser sensor 27. In addition, the teaching point generation program 47 is generated in advance for driving the robot apparatus 8 in order to generate teaching points.

As the sensor for detecting the operation position at which the robot apparatus 8 performs operation, it is not limited to the laser sensor, but any sensor that can detect the operation position can be used. For example, a three-dimensional sensor can be employed as a sensor. As a three-dimensional sensor, a time of flight (TOF) camera that captures distance images by optical time-of-flight method or a stereo camera that detects a three-dimensional position by parallax captured by two two-dimensional cameras, can be adopted.

The robot controller 4 includes the processing unit 51 configured to process the output of the laser sensor 27 and generate a teaching point. The processing unit 51 includes an operation position detecting unit 52 configured to detect the operation position at which the welding torch 2 performs operation based on the output of the laser sensor 27. The processing unit 51 includes a search point calculating unit 53 configured to calculate a position of a search point for determining the next teaching point along the operation line based on at least one teaching point. The processing unit 51 includes a command unit 54 configured to drive the robot 1 so as to move its position to a movement point corresponding to the search point. Additionally, the processing unit 51 includes a teaching point setting unit 55 configured to perform setting of the position of the teaching point based on the operation position detected by the laser sensor 27, after the position of the robot 1 moves to the movement point. The setting of the teaching point of the present embodiment includes setting the position of the teaching point and setting the orientation of the robot at the teaching point.

Each of the processing unit 51, the operation position detecting unit 52, the search point calculating unit 53, the command unit 54, and the teaching point setting unit 55 corresponds to a processor that is driven according to the teaching point generation program 47. A processor functions as each unit by reading the teaching point generation program 47 and performing the control determined in the teaching point generation program 47.

Figure 3:
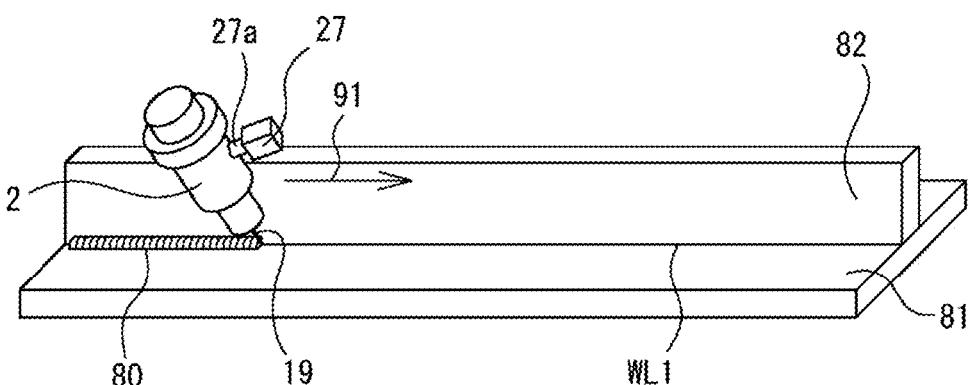
FIG. 3 is a perspective view of a workpiece and a welding torch when a robot apparatus according to an embodiment performs welding.

FIG. 3 illustrates an enlarged perspective view of the workpiece and the welding torch when the robot apparatus according to the present embodiment performs welding. Referring to FIGS. 1 and 3, in the present embodiment, a workpiece 81 is arranged on the top face of a platform 89. A workpiece 82 is arranged on the top face of the workpiece 81. The workpieces 81 and 82 of the present embodiment are plate-like members. Each surface of the workpieces 81 and 82 of the present embodiment is planar. The workpieces 81 and 82 are fixed to the platform 89 by a jig not illustrated.

The robot apparatus 8 welds the part in which the top face of the workpiece 81 and the end face of the workpiece 82 come into contact. The boundary line between the top face of the workpiece 81 and the end face of the workpiece 82 is a weld line WL1 serving as the operation line to be operated on. The robot controller 4 changes the position and the orientation of the robot 1 such that the tool center point of the welding torch 2 moves along the weld line WL1 as illustrated by an arrow 91. A bead 80 is formed in the welded portion. The teaching point generation apparatus of the present embodiment generates the teaching points of the robot apparatus 8 that performs such operation.

Figure 4:
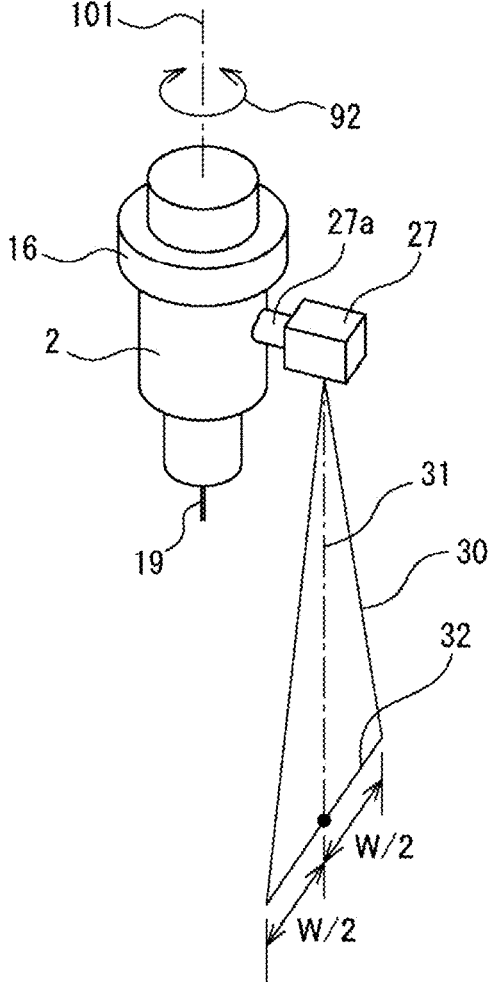
FIG. 4 is an enlarged perspective view of a welding torch and a laser sensor according to an embodiment.

FIG. 4 illustrates an enlarged perspective view of the welding torch and the laser sensor according to the present embodiment. The laser sensor 27 according to the present embodiment is supported by the robot 1. The laser sensor 27 is fixed to the welding torch 2 via a support member 27a. The laser sensor 27 according to the present embodiment emits a laser beam at an irradiation range 30 having a predetermined emission angle. The irradiation range 30 is planar. In particular, the irradiation range 30 of the present embodiment is fan-shaped. FIG. 4 illustrates a state in which a laser beam is irradiated to the planar surface of the workpiece. On the surface of the workpiece, an irradiation line 32, which is irradiated with the laser beam, is defined corresponding to the irradiation range 30. In the present embodiment, the line passing through the predetermined point in the laser sensor 27 and the midpoint of a width W of the irradiation line 32 is referred to a center line 31 of the irradiation range 30.

As the laser sensor 27, any sensor including a mechanism configured to emit a laser beam in the irradiation range 30 having a fan-shape can be adopted. For example, a sensor in which a laser beam is deflected and scanned can be employed. The sensor in which the laser beam is deflected and scanned includes a swing mirror that changes the emission direction of the laser beam. As the swing mirror swings, a laser beam is emitted within a predetermined range of emission angle. Further, the laser sensor includes a light-receiving element that receives the laser beam reflected by the surface of the workpiece. Based on the direction of the laser beam emitted by the swing mirror and the position of the laser beam in the light-receiving element, the position in which the laser beam is reflected on the workpiece can be detected. In particular, the position along the width direction of the irradiation range and the distance from the laser sensor to the surface of the workpiece can be detected. The position in which the laser beam is reflected can be calculated in the sensor coordinate system set for the laser sensor.

The position in which the laser beam is reflected on the surface of the workpiece can be calculated by the coordinate system of the sensor. A line connecting a plurality of the positions detected by scanning the laser beam can then be generated. Based on the line connecting the plurality of the positions, the welding position on the weld line can be detected. For example, a point at which the line connecting the plurality of the positions bends can be set at the welding position to be welded. In addition, based on the position and the orientation of the robot 1, the welding position expressed in the sensor coordinate system can be converted to the welding position expressed in the world coordinate system 71.

Figure 5:
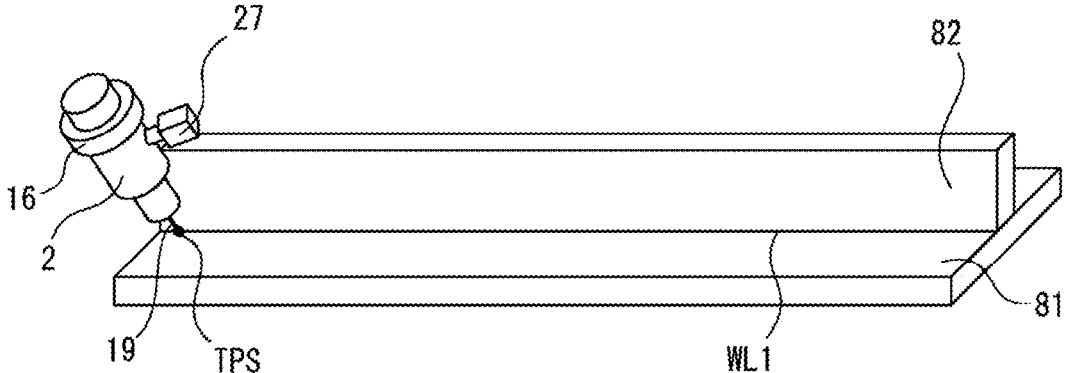
FIG. 5 is a perspective view of a workpiece and a welding torch when a start teaching point for starting welding is set.

FIG. 5 illustrates a perspective view of the workpiece and the welding torch when the position of the robot is arranged at the start teaching point at which welding starts. The operator first sets a start teaching point TPS that is a teaching point indicating a start of welding. The operator can set the start teaching point TPS by manually driving the robot 1. The operator operates the input part 3a of the teach pendant 3 and changes the position and the orientation of the robot 1. Then, the position of the robot 1 is adjusted such that the tip of the wire 19 (tool center point) is arranged at the start point of welding. Furthermore, the orientation of the robot 1 is adjusted such that the welding torch 2 is at desired target angle and forward angle. In the present embodiment, the forward angle is taken as an example, but the backward angle may be used.

At this time, the operator preferably adjusts the rotational position of the flange 16 of the wrist 15 such that the laser sensor 27 is arranged in the extension direction of the weld line WL1. In particular, it is preferable to arrange the laser sensor 27 such that the weld line WL1 to be welded is within the irradiation range 30 of the laser beam.

Thus, in the present embodiment, the start teaching point is set in advance. It should be noted that, the start teaching point can be set by any method. For example, the operator may set the start teaching point TPS by entering coordinate values of a predetermined coordinate system from the input part 3a of the teach pendant 3. Then, by the operator operating the input part 3a of the teach pendant 3, the robot controller 4 initiates control for automatically generating the teaching point.

Figure 6:
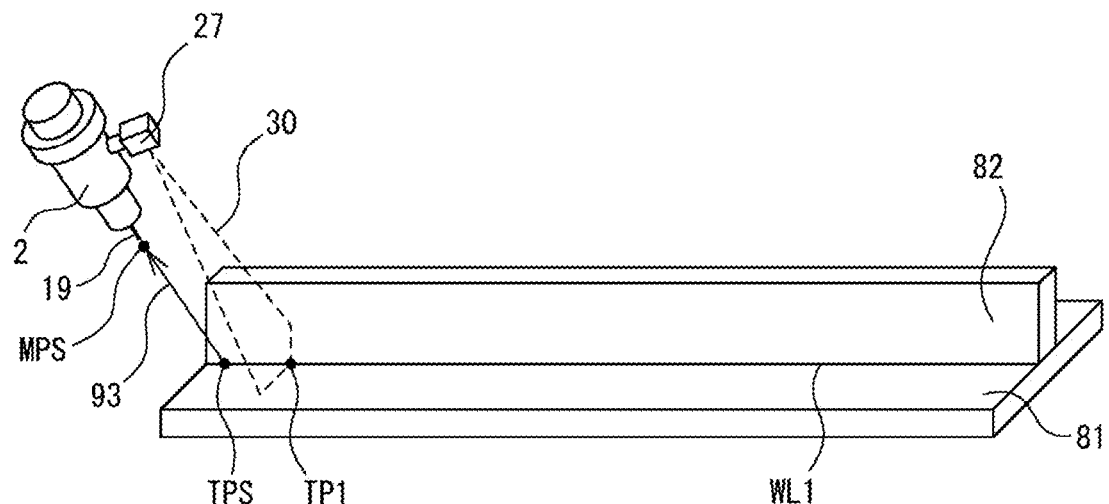
FIG. 6 is a perspective view of a workpiece and a welding torch when the welding torch is retracted from a start teaching point.

FIG. 6 illustrates a perspective view when the welding torch is retracted from the start teaching point in a predetermined direction. Referring to FIGS. 1, 2 and 6, the command unit 54 of the processing unit 51 performs control for retracting the welding torch 2 from the workpieces 81 and 82 in a predetermined direction and by a predetermined distance from the start teaching point TPS. In the example here, the command unit 54 changes the position of the robot 1 so as to move the welding torch 2 in the direction of the Z-axis of the tool coordinate system 72. The position of the robot 1 moves from the start teaching point TPS to a movement point MPS. As illustrated by an arrow 93, the tip point of the wire 19 moves away from the start teaching point TPS. The direction in which the welding torch 2 is retracted is not limited to the Z-axis direction of the tool coordinate system 72, but any direction away from the workpieces 81 and 82 can be adopted. At this time, it is preferable to move the welding torch 2 in the direction and by the distance in which the weld line WL1 can be captured by the laser sensor 27.

The robot controller 4 performs setting control for setting the position of the teaching point while moving the welding torch 2 along the weld line WL1. In the present embodiment, the setting of the position of the teaching point is repeated while the welding torch 2 is maintained in a state of being retracted from the workpieces 81 and 82. In other words, in a state where the tool center point is away from the weld line WL1, the position of the teaching point is set while the welding torch 2 is moved in the direction along the weld line WL1.

In the present embodiment, the robot 1 is set in a predetermined orientation during a period of performing setting control for setting the position of the teaching point. For example, the operator can enter in advance, in the robot controller 4, the orientation of the robot 1 for performing the setting control. Alternatively, the orientation of the robot 1 at the time when the operator sets the start teaching point TPS may be maintained.

First, the teaching point setting unit 55 sets a position of a teaching point TP1 based on the position of the start teaching point TPS. The weld line WL1 serving as an operation line is arranged inside the irradiation range 30 of the laser beam of the laser sensor 27. The irradiation range 30 intersects the extension direction of the weld line WL1. The operation position detecting unit 52 detects the position of the weld line WL1, i.e., the welding position to be welded, based on the output of the laser sensor 27. The teaching point setting unit 55 according to the present embodiment sets this welding position as the position of the teaching point TP1.

Figure 7:
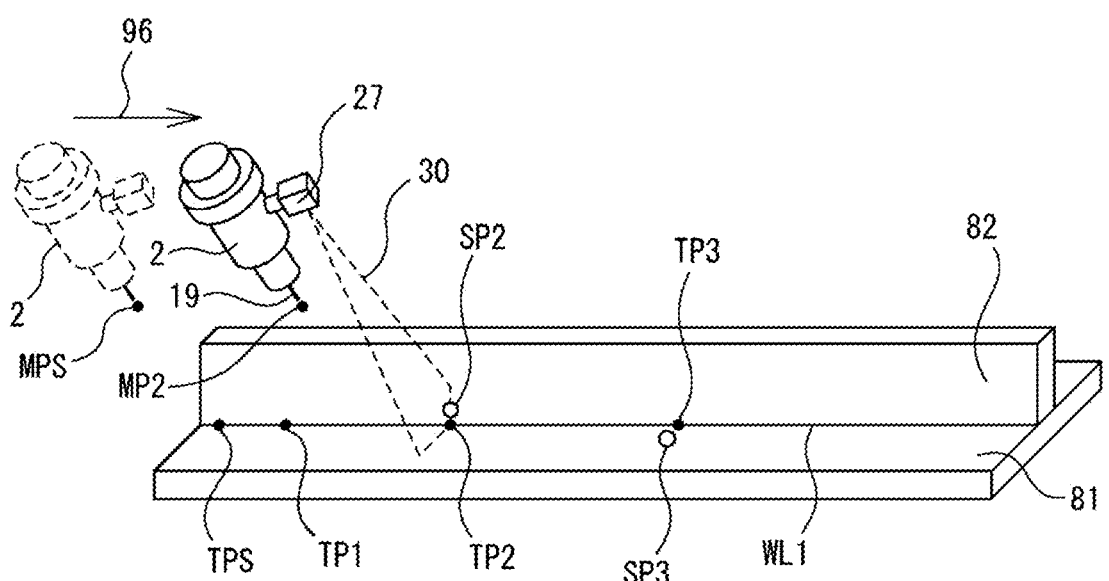
FIG. 7 is a perspective view of a workpiece and a welding torch when the welding torch is moved to a position corresponding to a search point.
Figure 8:
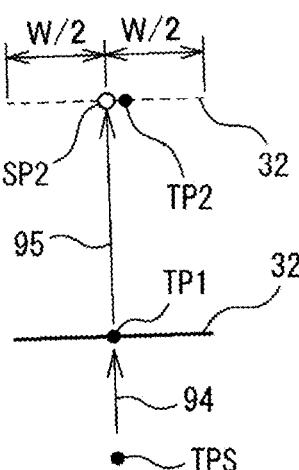
FIG. 8 is a diagram illustrating a control for setting a position of a search point and a next teaching point based on two teaching points.

FIG. 7 illustrates a perspective view of the welding torch and the workpiece illustrating the control for setting the position of the next teaching point. FIG. 8 illustrates a diagram illustrating the control for setting the position of the next teaching point. Referring to FIGS. 7 and 8, the processing unit 51 generates a next teaching point TP2 along the weld line WL1 based on the already set teaching points TPS and TP1.

The search point calculating unit 53 performs a search point calculating step for calculating a position of a search point for determining the next teaching point along the weld line WL1 based on at least one teaching point. The search point calculating unit 53 calculates a straight line extending from the start teaching point TPS to the teaching point TP1, as illustrated by an arrow 94. The search point calculating unit 53 sets a search point SP2 on the extension of the straight line of the arrow 94 as illustrated by an arrow 95. The distance from the teaching point as a reference, to the search point can be predetermined. In the example here, the distance of the straight line from the teaching point TPS to the search point SP2 can be predetermined.

Next, the command unit 54 performs a drive step for driving the robot 1 such that the position of the robot 1 moves to a movement point MP2 corresponding to the search point SP2. The command unit 54 calculates the position of the movement point MP2, which is the position of the robot 1 corresponding to the search point SP2. The command unit 54 calculates the position of the movement point MP2 to which the position of the robot 1 is moved from the movement point MPS in the same direction and by the same distance as the direction and the distance (the direction and the distance illustrated by the arrow 95) from the teaching point TP1 toward the search point SP2. The command unit 54 drives the robot 1 such that the robot 1 is arranged at a position of the calculated movement point MP2. The command unit 54 moves the welding torch 2 as illustrated by an arrow 96.

Next, the operation position detecting unit 52 performs a position detecting step of detecting an operation position on the weld line WL1 with the laser sensor 27. The operation position detecting unit 52 detects, based on the output of the laser sensor 27, the welding position to be welded for the workpieces 81 and 82, after the position of the robot 1 moves to the movement point MP2 corresponding to the search point SP2.

Next, the teaching point setting unit 55 performs the teaching point setting step of setting the teaching point based on the welding position detected by the laser sensor 27. The teaching point setting unit 55 of the present embodiment acquires a welding position from the operation position detecting unit 52 and sets this welding position as the position of the teaching point TP2. In the example illustrated in FIGS. 7 and 8, the teaching point TP2 is slightly deviated from the search point SP2.

In the present embodiment, such control including calculating the position of the search point by the search point calculating unit 53, driving the robot 1 by the command unit 54, and setting the position of the teaching point by the teaching point setting unit 55, is referred to a setting control. The robot controller 4 generates a plurality of teaching points along the weld line WL1 by repeating the setting control. Additionally, the robot controller 4 sets positions of a plurality of teaching points. In other words, the robot controller 4 sets the positions of a plurality of teaching points along the weld line WL1 by repeating a setting step including a search point calculating step, a drive step, a position detecting step, and a teaching point setting step.

Figure 9:
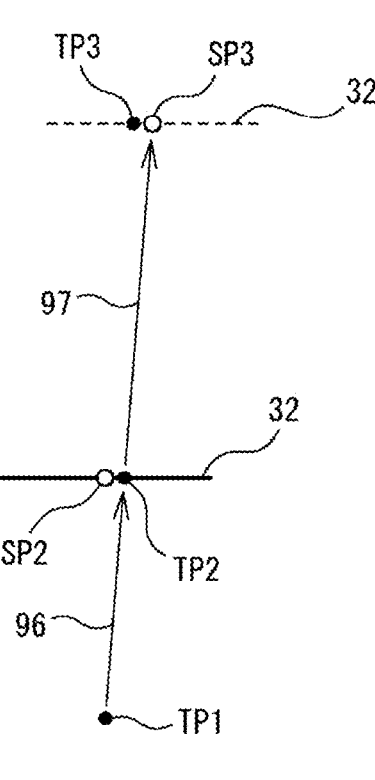
FIG. 9 is another diagram illustrating a control for setting a position of a search point and a next teaching point based on two teaching points.

FIG. 9 illustrates a diagram illustrating the control for setting the position of the next teaching point. Referring to FIGS. 7 and 9, the processing unit 51 repeats a setting control similar to the setting control for setting the position of the teaching point TP2. The processing unit 51 of the present embodiment sets a teaching point TP3 based on the teaching point TP1 and the teaching point TP2 that are set in the recent control.

The search point calculating unit 53 calculates a straight line from the teaching point TP1 toward the teaching point TP2 as illustrated by the arrow 96. The search point calculating unit 53 sets a search point SP3 on the extension of the straight line indicated by the arrow 96, as illustrated by an arrow 97. The distance from the teaching point TP2 to the search point SP3 can adopt a predetermined distance. For example, the distance from the teaching point TP2 to the search point SP3 can be the same as the distance from the teaching point TPS to the search point SP2. The search point calculating unit 53 calculates the position of the search point SP3 for determining the next teaching point TP3, based on the position of the teaching point TP2 set in the previous setting control and the position of the teaching point TP1 set before the teaching point TP2 set in the previous setting control.

The command unit 54 calculates the position of the movement point corresponding to the search point SP3. The command unit 54 calculates the direction and distance from the search point SP2 toward the search point SP3. The command unit 54 calculates the position of the movement point corresponding to the search point SP3 based on the direction and distance from the search point SP2 toward the search point SP3 and the position of the movement point MP2. The command unit 54 moves the position of the robot 1 to the movement point corresponding to the search point SP3. In the present embodiment, the command unit 54 changes the position of the robot 1 such that the center line 31 of the irradiation range 30 passes through the search point SP3. In the present embodiment, the extension direction of the irradiation line 32 at this time is parallel to the irradiation line 32 when the workpieces 81 and 82 are irradiated with a laser beam at the movement point MP2.

The operation position detecting unit 52 detects the welding position based on the output of the laser sensor 27, after the robot 1 is moved to the movement point corresponding to the search point SP3. Then, teaching point setting unit 55 sets the teaching point TP3 based on the welding position detected by the operation position detecting unit 52.

Figure 10:
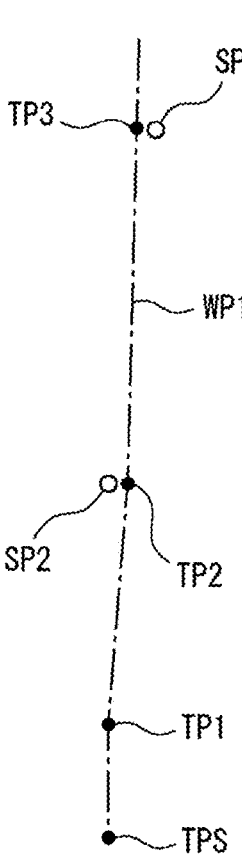
FIG. 10 is a diagram illustrating teaching points generated by setting control according to an embodiment.

FIG. 10 illustrates a welding path generated by repeating the setting control. The path through the teaching points TPS, TP1, TP2 and TP3 is a welding path WP1 as an operation path. In this way, the teaching point generation apparatus of the present embodiment can generate the teaching point and set the position of the teaching point by repeating the setting control. In addition, the teaching point generation method of the present embodiment can generate the teaching points and set the position of the teaching points by repeating the setting control.

The teaching point setting unit 55 can calculate an operation path based on the position of the teaching point. The teaching point setting unit 55 can set the orientation of the robot 1 at each teaching point based on the operation path. For example, the teaching point setting unit 55 can set the orientation of the robot 1 such that the orientation of the welding torch is at a predetermined forward angle or backward angle and a predetermined target angle based on the generated operation path. The teaching point setting unit 55 can calculate the orientation of the robot 1 for each teaching point.

In the teaching point generation apparatus and the teaching point generation method of the present embodiment, teaching points can be generated without generating a robot path to be a reference in advance. In addition, since the teaching points can be generated automatically, even a low-skilled operator can easily generate the teaching points. Additionally, the operator can generate the teaching points in a short time. Furthermore, since the sensor detects the welding position on the weld line, the teaching point can be set at the exact position.

In the present embodiment, the search point calculating unit 53 calculates the position of the search point for determining the next teaching point, based on the position of the teaching point set in the previous setting control and the position of the teaching point set before the teaching point set in the previous setting control. By adopting this control, a search point can be set in the vicinity of the next teaching point by using the teaching point already set. In particular, the search point calculating unit 53 of the present embodiment calculates the position of the search point, based on the position of the teaching point set in the previous setting control and the position of the teaching point set in the two times previous setting control. In other words, the search point calculating unit 53 calculates a position of a search point based on the positions of two consecutive teaching points. By the control of calculating the position of the search point based on the positions of two consecutive teaching points, the amount of calculating the search point can be reduced.

The search point calculating unit 53 may calculate the position of the search point corresponding to the next teaching point based on the positions of three or more teaching points. For example, the search point calculating unit may calculate a straight line by the least square method based on the positions of three or more teaching points and set the search point on this straight line. In addition, in the above embodiment, the search point is set on the extension of the straight line connecting the plurality of teaching points, but the embodiment is not limited to this. For example, the search point calculating unit may set a search point on an extension of a curve, such as an arc, through a plurality of teaching points.

In the present embodiment, the setting control is performed while the welding torch 2 is maintained in a state of being retracted from the workpieces 81 and 82. By performing this control, it is possible to avoid the welding torch 2 from colliding with the workpieces 81 and 82 or with the fixing members arranged around the workpieces 81 and 82, or the like. For example, in the case in which a workpiece is bent, the welding torch may collide with the workpiece when the welding torch moves linearly to the movement point corresponding to the search point. By setting the position of the teaching point in a state where the welding torch is away from the workpiece, collision between the welding torch and other objects can be avoided. The setting control may be performed without retracting the welding torch from the workpiece. In other words, the position of the teaching point may be set while the tool center point is maintained in a state of being arranged in the vicinity of the weld line.

The sensor of the present embodiment is the laser sensor 27 that emits a laser beam in the irradiation range 30 having a planar shape with a predetermined emission angle. By employing this configuration, the position of the welding torch 2 can be controlled by using the width direction of the irradiation range 30 of the laser beam, and the center line 31 of the irradiation range 30.

Figure 11:
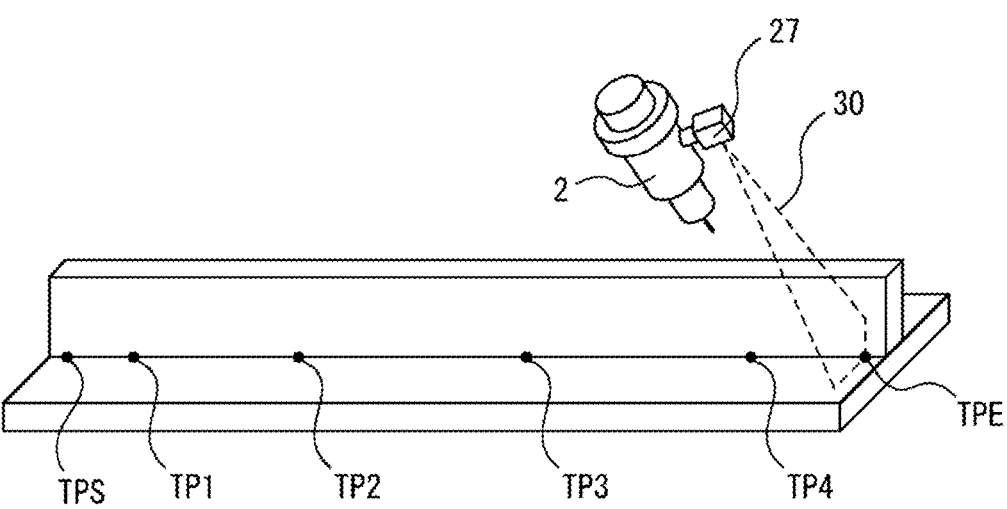
FIG. 11 is a perspective view of a workpiece and a welding torch when the welding torch progresses to a position corresponding to an end teaching point.

FIG. 11 illustrates a perspective view of the workpiece and the welding torch when the setting control is repeated and the welding position detected by the laser sensor reaches the end point of the welding. In the example illustrated in FIG. 11, the start teaching point TPS, the teaching points TP1 to TP4, and the end teaching point TPE, are illustrated. The condition for terminating the setting control can be predetermined. For example, the range of the position of the search point at which the setting control is terminated, can be predetermined. When the search point calculated by the search point calculating unit 53 reaches within a predetermined position range, the teaching point detected corresponding to the search point can be set to the end teaching point TPE, which is the teaching point at which the operation is terminated.

Alternatively, the range of the position of the end teaching point can be predetermined. When the newly generated teaching point is a point within the range of the position of the end teaching point, the newly generated teaching point can be set to the end teaching point TPE and the setting control can be terminated.

Alternatively, after the position of the robot moves to the movement point corresponding to the search point, the setting control may be terminated when the operation position detecting unit 52 is unable to detect the welding position based on the output of the laser sensor 27. In this case, the teaching point setting unit 55 can set the teaching point that is set last among the already set teaching points as the end teaching point TPE.

Alternatively, when the laser beam reaches the vicinity of the end point of the welding, the operator may terminate the setting control by operating the teach pendant 3. The operator may then move the welding torch 2 by operating the teach pendant 3 and set the end teaching point TPE.

Figure 12:
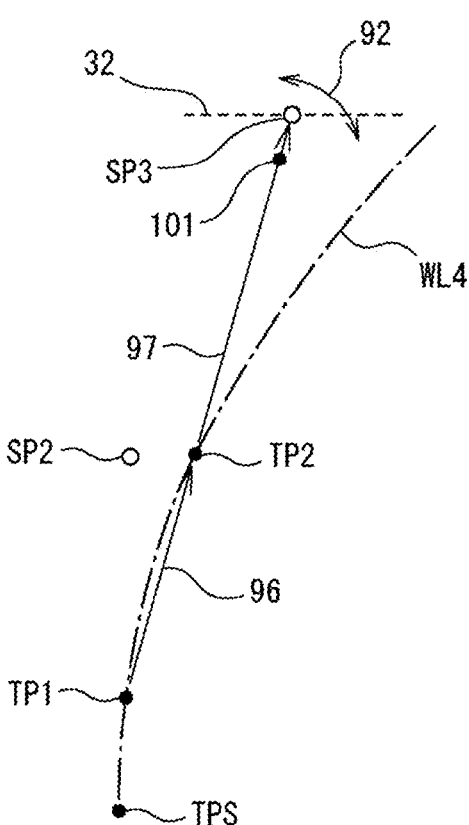
FIG. 12 is a diagram illustrating a first step of control when a laser sensor cannot detect an operation position in which welding is performed.

FIG. 12 illustrates a diagram illustrating the control when the laser sensor cannot detect the welding position. In the example illustrated in FIG. 12, the teaching points are generated along a weld line WL4. The weld line WL4 includes a curved section with a small radius of curvature. In the example here, the search point SP2 is calculated based on the start teaching point TPS and the teaching point TP1. Furthermore, the position of the robot 1 is moved to the movement point corresponding to search point SP2, and the position of the teaching point TP2 is set.

Next, the search point calculating unit 53 calculates the position of the search point SP3 based on the positions of the teaching points TP1 and TP2. The command unit 54 calculates the position of the movement point corresponding to the search point SP3. The command unit 54 changes the position of the robot 1 such that the center line 31 of the irradiation range 30 of the laser beam passes through the search point SP3. However, the irradiation line 32 of the laser beam is away from the weld line WL4. For this reason, the operation position detecting unit 52 is unable to detect the welding position based on the output of the laser sensor 27. Thus, after the position of the robot 1 moves to the movement point, the welding position may not be detected by the output of the laser sensor 27.

In this case, the command unit 54 can drive the robot 1 so as to rotate the laser sensor 27 around a predetermined rotation axis 101. Referring to FIGS. 4 and 12, in the example here, the driving axis of the flange 16 of the robot 1 is set to the rotation axis 101. The command unit 54 performs control for rotating the welding torch 2 around the rotation axis 101, as illustrated by an arrow 92. As the welding torch 2 rotates, the laser sensor 27 rotates.

The angle of rotation of the laser sensor 27 can be predetermined. For example, the command unit 54 can rotate the laser sensor 27 within a predetermined range of angle with respect to the direction, illustrated by the arrow 97, from the teaching point TP2 toward the search point SP3. The command unit 54 can stop the rotation of the laser sensor 27 for each predetermined angle. Then, the operation position detecting unit 52 performs the detection of the operation position at the position after the rotation.

Figure 13:
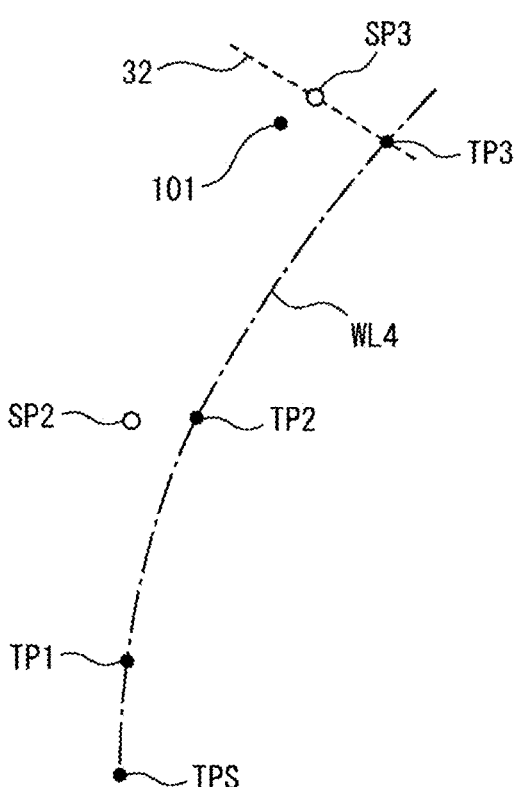
FIG. 13 is a diagram illustrating a second step of control when a laser sensor cannot detect an operation position in which welding is performed.

FIG. 13 illustrates a diagram when the laser sensor is rotated. Referring to FIGS. 12 and 13, by rotating the laser sensor 27 around the rotation axis 101, a state where the weld line WL4 passes through within the range of the irradiation line 32 can be achieved. The operation position detecting unit 52 can detect the welding position based on the output of the laser sensor 27.

Thus, when the operation position cannot be detected from the output of the laser sensor 27, a peripheral search control, which is performed by rotating the laser sensor 27 and detecting the welding position, can be performed. The teaching point setting unit 55 sets the welding position detected by the peripheral search control to the position of the teaching point TP3. By performing this control, the welding position can be detected when the weld line WL4 is in the vicinity of the irradiation range 30 of the laser sensor 27.

In the present embodiment, the drive axis of the flange 16 is adopted as the rotation axis for rotating the laser sensor 27, but the rotation axis is not limited to this configuration. The laser sensor can rotate around any rotation axis. For example, the rotation axis can adopt the Z-axis of the tool coordinate system 72. In addition, the rotation axis can adopt any axis that passes through the tool center point. Furthermore, a rotation axis set at a position away from the welding torch may be adopted. Referring to FIG. 6, this peripheral search control may be performed when the next teaching point TP1 cannot be detected from the output of the laser sensor 27 at the position in which the welding torch 2 is retracted from the start teaching point TPS to the movement point MPS.

Further, referring to FIG. 12, when the laser sensor 27 cannot detect the welding position after the position of the robot 1 moves to the movement point corresponding to the search point, the search point calculating unit 53 can perform control for shortening the distance from the teaching point TP2 to the search point SP3 illustrated by the arrow 97. In other words, it is possible to perform the control for shortening the movement distance of the welding torch 2 moving from the movement point corresponding to the search point SP2 toward the movement point corresponding to the search point SP3.

The search point calculating unit 53 sets the distance from the teaching point TP2 to the search point shorter than the current distance from the teaching point TP2 to the search point SP3. In other words, the modified position of the search point is calculated by shortening the movement distance illustrated by the arrow 97. The method for setting the distance from the teaching point TP2 to the modified search point can be predetermined. Then, the command unit 54 drives the robot 1 to the movement point corresponding to the modified search point. After this, the operation position detecting unit 52 performs detection of the welding position based on the output of the laser sensor 27.

In this way, when the operation position cannot be detected based on the output of the laser sensor 27, a movement distance change control for shortening the distance from the teaching point to the search point can be performed. By performing this control, the distance from the already generated teaching point to the search point is shortened. Even when the weld line WL4 is curved or bent, the distance from the search point to the weld line can be shortened. As a result, the possibility of detecting the welding position by the laser sensor 27 is improved. Note that the movement distance change control can be performed repeatedly. For example, when the movement distance change control is performed and the operation position cannot be detected even when the distance from the teaching point to the search point is shortened, the movement distance change control can be further performed.

The peripheral search control and the movement distance change control described above can be performed in combination. For example, the processing unit 51 can perform the movement distance change control when the welding position cannot be detected by performing the peripheral search control. Alternatively, the processing unit 51 can perform the peripheral search control when the welding position cannot be detected by performing the movement distance change control.

Figure 14:
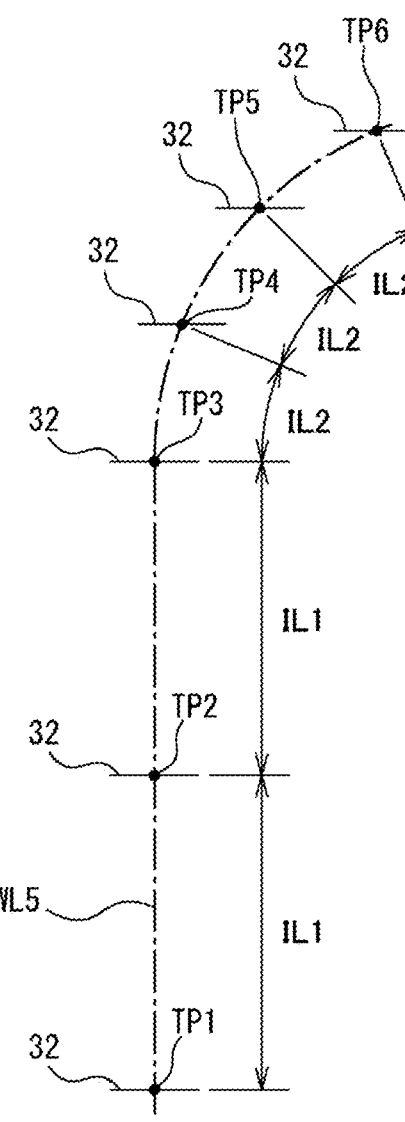
FIG. 14 is a diagram of a welding path when welding is performed along a weld line including a straight line and a curve.

FIG. 14 illustrates a diagram illustrating the control for setting the position of the teaching point relative to the weld line including a linear weld line and a curved weld line. A weld line WL5 includes a linear section and a curved section. In FIG. 14, the irradiation line 32 of the laser beam at each of the teaching points TP1 to TP6 is illustrated on the weld line WL5. As mentioned above, when the weld line is curved, the welding position on the weld line may not be detected after the position of the robot 1 moves to the search point.

Then, the search point calculating unit 53 can set the distance from the teaching point to the search point to a first distance when the weld line WL5 along the path from the teaching point toward the search point is linear. In each of segments ILL since the weld line WL5 extends linearly, the distance from the teaching point to the search point is set to the first distance. On the other hand, the search point calculating unit 53 can set the distance from the teaching point to the search point to a second distance smaller than the first distance when the weld line WL5 along the path from the teaching point toward the search point is curved. In each of segments IL2, since the weld line WL5 extends in a curved line, the distance from the teaching point to the search point is set to the second distance. The interval between the teaching points in the segments IL2 is narrower than the interval between the teaching points in the segments ILL A segment in which a search point is to be detected at the first distance and a segment in which a search point is to be detected at the second distance can be predetermined. For example, for the position of the search point, the range of the segments IL1 in which the search point is detected by the first distance and the range of the segments IL2 in which search point is detected by the second distance can be predetermined.

Alternatively, the operator can change the distance from the teaching point to the search point by operating the teach pendant 3. The input part 3*a* of the teach pendant 3 of the present embodiment is configured such that the distance from the teaching point to the search point can be adjusted. For example, a distance change button for changing the distance is arranged in the input part 3*a*. When the distance change button is not pressed, the search point calculating unit 53 can set the distance from the teaching point to the search point to the first distance. On the other hand, when the distance change button is pressed, the search point calculating unit 53 can set the distance from the teaching point to the search point to the second distance.

During a period of setting the teaching point with the welding torch 2 being moved, the operator checks the position of the welding torch 2. The operator can change the distance from the teaching point to the search point by operating the distance change button. The operator can manually adjust the distance from the teaching point to the search point based on the position of the welding torch 2 during a period of performing the setting control. It should be noted that three or more segments, at which the movement distance is changed, may be set. In addition, the movement distance may be changed with three or more kinds of the movement distance.

Figure 15:
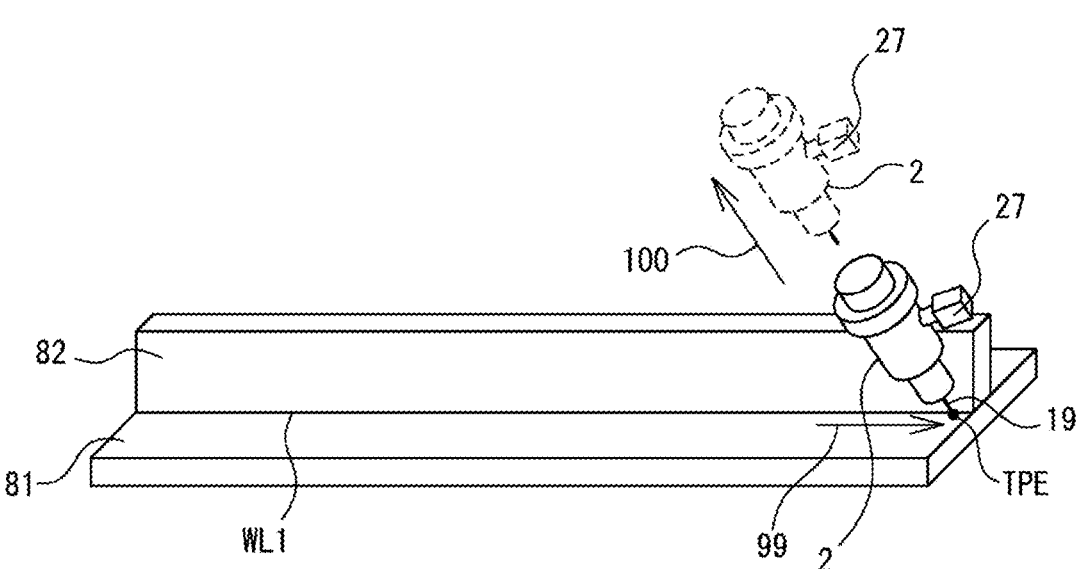
FIG. 15 is a perspective view of a workpiece and a welding torch when a playback control according to an embodiment is performed.

FIG. 15 illustrates a perspective view of the workpiece and the welding torch when the robot apparatus is actually driven based on the teaching points generated by the setting control. Referring to FIGS. 2 and 15, the robot controller 4 includes the playback control unit 60 that performs playback control for driving the robot 1 based on the teaching points generated by the setting control. The playback control unit 60 corresponds to a processor that is driven according to the teaching point generation program 47. The processor functions as the playback control unit 60 by reading the teaching point generation program 47 and performing the control determined in the teaching point generation program 47.

The playback control unit 60 acquires the position of the teaching point set by the teaching point setting unit 55. Additionally, the playback control unit 60 acquires the orientation of the robot 1 at the teaching point set by the teaching point setting unit 55. Note that the orientation of the robot 1 when the robot 1 is performing the playback control may adopt the orientation of the robot 1 when the robot 1 is performing the setting control. The playback control unit 60 sends a command, to the operation control unit 43, for driving the robot 1 such that the welding torch 2 is moved in a state of not driving the welding controller 5. The operator can check the change of the position and the orientation of the robot 1 during the actual welding being performed.

The tip point (tool center point) of the wire 19 is moved along the weld line WL1 as illustrated by an arrow 99. At this time, the operation position detecting unit 52 may detect the welding position again based on the output of the laser sensor 27. The teaching point setting unit 55 may modify the position of the already generated teaching point based on the welding position detected by the operation position detecting unit 52.

The playback control unit 60 according to the present embodiment reduces the movement speed of the welding torch 2 in the vicinity of the end teaching point TPE, at which the operation is terminated, when the playback control is being performed. The playback control unit 60 performs a control that reduces the driving speed of the robot 1. The range of the position of the robot 1, in which the movement speed of the welding torch 2 is reduced, can be predetermined. Alternatively, the playback control unit 60 may gradually reduce the driving speed of the robot 1 as approaching the end teaching point TPE.

The operator stops the playback control by operating the teach pendant 3 in the vicinity of the end teaching point TPE. The operator then operates the input part 3*a* of the teach pendant 3 and manually drives the robot 1, and thus the operator can set the position of the end teaching point TPE. In other words, the operator can modify the position of the end teaching point TPE. The teaching point setting unit 55 modifies the position of the end teaching point TPE in response to the operation by the operator of the input part 3*a*. The modified teaching point can be stored in the storage part 42.

For example, the setting control may be terminated when the operation position detecting unit 52 is unable to detect the welding position. The end teaching point may be set being deviated from the desired end teaching point. In this case, the end teaching point can be manually modified by the operator. Alternatively, since the end teaching point at which the welding is terminated, is an important teaching point that greatly affects the quality of the workpiece, a more accurate position of the end teaching point can be set by the operator.

The playback control unit 60 of the present embodiment performs control for reducing the driving speed of the robot 1 within a predetermined range in the vicinity of the end teaching point. Since the movement speed of the welding torch 2 is reduced by performing this control, the operator can easily stop the robot 1 at the desired position.

In the case of performing actual welding operation, the robot apparatus 8 performs control for bringing the welding torch 2 closer to the start teaching point TPS, after arranging the tip point of the welding torch 2 at the movement point near the start teaching point TPS before starting the actual operation. Such a movement point near the start teaching point TPS is referred to as an approaching point. In other words, the robot controller 4 arranges the position of the robot 1 at the approaching point and then arranges the position of the robot 1 at the start teaching point TPS.

Referring to FIG. 6, the teaching point setting unit 55 can set, as the approaching point, the position and the orientation of the robot 1 when the welding torch 2 is retracted from the start teaching point TPS in a predetermined direction and by a predetermined distance. For example, the teaching point setting unit 55 can set, as the approaching point, the point to which the welding torch 2 is retracted from the start teaching point TPS in the direction of the Z-axis of the tool coordinate system. By adopting this control, the processing unit 51 can automatically generate a teaching point corresponding to the approaching point without the operator teaching the approaching point. Further, the processing unit 51 can generate the approaching point during a period of performing the control for generating a plurality of teaching points. The number of teaching points set by the operator can be reduced.

In addition, referring to FIG. 15, when the actual welding operation is terminated, the robot apparatus 8 changes the position and the orientation of the robot 1 in order to perform the next operation, after arranging the tip point of the welding torch 2 at a point away from the workpieces 81 and 82. In other words, after arranging the position of robot 1 at the movement point retracted from the end teaching point TPE, the robot controller 4 changes the position and the orientation of the robot 1 in order to perform the next operation. This movement point is referred to as a relief point. The teaching point setting unit 55 of the present embodiment can automatically set the relief point when the end teaching point TPE is set.

As illustrated by an arrow 100, the teaching point setting unit 55 can set, as the relief point, the position of the robot 1 to which the welding torch 2 is retracted from the workpieces 81 and 82 in the predetermined direction from the end teaching point TPE and by the predetermined distance. For example, the teaching point setting unit 55 can set the movement point, as the relief point, to which the welding torch 2 is retracted from the end teaching point TPE in the direction of the Z-axis of the tool coordinate system. By adopting this control, the processing unit 51 can automatically generate a teaching point corresponding to the relief point without the operator teaching the relief point. The number of teaching points set by the operator can be reduced.

In the present embodiment, the description is made by using a fillet welding, in which welding is performed for a portion where two members are contacting and forming a corner, as an example, but not limited to this configuration. Control for generating the teaching point of the present embodiment can also be performed to butt welding, in which respective end faces of the two members are welded so as to face each other. In addition, although the surface of the workpiece of the present embodiment is planar, the surface is not limited to this configuration. The control of the present embodiment can also be applied when operation is performed on a workpiece including a curved surface. For example, when operation is performed on a curved surface, the control of the present embodiment can be performed by shortening the distance from the teaching point to the search point.

Furthermore, in the present embodiment, a robot apparatus that performs arc welding is used as an example for description, the robot apparatus is not limited to this configuration. The control of the present embodiment can be applied to any robot apparatus that performs operation along the operation line. For example, the control according to the present embodiment can be applied to a robot apparatus that performs laser welding or a robot apparatus that includes an operation tool which applies adhesives.

The above embodiments can be combined as appropriate. In each of the drawings described above, the same or equivalent parts are denoted by the same sign. It should be noted that the above embodiments are examples and do not limit the invention. The embodiments include modifications of the embodiments described in the claims.

REFERENCE SIGNS LIST 1 robot
2 welding torch 3 teach pendant
3*a* input part
4 robot controller
8 robot apparatus
10 controller
27 laser sensor
30 irradiation range
31 center line
32 irradiation line
40 operation program
52 operation position detecting unit
53 search point calculating unit
54 command unit
55 teaching point setting unit
60 playback control unit
81, 82 workpiece
101 rotation axis
TP1 to TP6 teaching point
SP1 to SP3 search point
MP2 movement point
WL1, WL4, WL5 weld line

The invention claimed is:

1. A teaching point generation apparatus configured to generate a teaching point of a robot apparatus including a robot and an operation tool, comprising:

a sensor configured to detect an operation position on an operation line in which the robot apparatus performs operation on a workpiece;

a search point calculating unit configured to calculate a position of a search point for determining a next teaching point along the operation line based on at least one teaching point;

a command unit configured to drive the robot so that the position of the robot moves to a movement point corresponding to the search point; and a teaching point setting unit configured to set a position of a teaching point based on the operation position detected by the sensor, after the position of the robot moves to the movement point; wherein the positions of a plurality of the teaching points along the operation line are set by repeating a setting control including the calculating a position of a search point by the search point calculating unit, the driving the robot by the command unit, and the setting a position of a teaching point by the teaching point setting unit.

2. The teaching point generation apparatus of claim 1, further comprising an operation panel configured to manually operate the operation of the robot apparatus, wherein the operation panel includes an input part capable of adjusting a distance from the teaching point to the search point.

3. The teaching point generation apparatus of claim 1, wherein the search point calculating unit sets the distance from the teaching point to the search point to a first distance when the operation line along a path extending from the teaching point to the search point is linear, and sets the distance from the teaching point to the search point to a second distance shorter than the first distance when the operation line along the path extending from the teaching point to the search point is curved.

4. The teaching point generation apparatus of claim 1, wherein when the sensor is unable to detect the operation position after the position of the robot moves to the movement point, the command unit drives the robot so as to rotate the sensor around a predetermined rotation axis, and the sensor performs a detection of the operation position at the position after the rotation.

5. The teaching point generation apparatus of claim 1, wherein when the sensor is unable to detect the operation position after the position of the robot moves to the movement point, the search point calculating unit calculates a modified position of the search point by shortening the distance from the teaching point to the search point so as to be shorter than the current distance from the teaching point to the search point, the command unit drives the robot so that the position of the robot moves to a movement point corresponding to the modified position of the search point, and the sensor performs detection of the operation position.

6. The teaching point generation apparatus of claim 1, wherein the setting control is terminated when the sensor is unable to detect the operation position, after the position of the robot moves to the movement point.

7. The teaching point generation apparatus of claim 1, wherein a start teaching point as a teaching point indicating the start of operation is predetermined, the command unit performs a control for retracting the operation tool from the workpiece in a predetermined direction and by a predetermined distance from the start teaching point, and the teaching point generation apparatus performs the setting control while the operation tool is maintained in a state being retracted from the workpiece.

8. The teaching point generation apparatus of claim 1, wherein a start teaching point as a teaching point indicating the start of operation is predetermined, and the teaching point setting unit performs control for setting the position, to which the operation tool is retracted from the workpiece in a predetermined direction and by a predetermined distance from the start teaching point, as a position of an approaching point before starting the actual operation, and control for setting the position, to which the operation tool is retracted from the workpiece in a predetermined direction and by a predetermined distance from an end teaching point that is a teaching point indicating the end of operation, as a position of a relief point after the actual operation is terminated.

9. The teaching point generation apparatus of claim 1, further comprising:

an operation panel configured to manually operate the operation of the robot apparatus; and a playback control unit configured to perform playback control for driving the robot based on the teaching point generated by the setting control; wherein the operation panel includes an input part formed to manually change a position and an orientation of the robot, the playback control unit, when performing the playback control, performs control for reducing the drive speed of the robot so that the movement speed of the operation tool is reduced in a predetermined range in the vicinity of an end teaching point that is a teaching point indicating the end of operation, and stops the playback control in response to the operation of the operation panel by an operator, and the teaching point setting unit modifies the position of the end teaching point in response to the operation of the input part by the operator.

* * * * *